United States Patent [19]

Shachar

[11] 4,333,736
[45] Jun. 8, 1982

[54] METHOD OF UTILIZING SOLAR PONDS FOR EFFECTING CONTROLLED TEMPERATURE CHANGES OF SOLUTIONS PARTICULARLY IN PROCESSES INVOLVING THE DISSOLUTION AND/OR PRECIPITATION OF SALTS

[75] Inventor: Sraya Shachar, Ramat Gan, Israel

[73] Assignee: Solmat Systems Ltd., Jerusalem, Israel

[21] Appl. No.: 113,782

[22] Filed: Jan. 21, 1980

[30] Foreign Application Priority Data

Jan. 26, 1979 [IL] Israel ......................................... 56510

[51] Int. Cl.³ ................................................ B01D 9/02
[52] U.S. Cl. .................................. 23/295 S; 23/302 R; 23/302 T
[58] Field of Search .............. 23/295 S, 302 T, 302 R; 126/415, 452

[56] References Cited

U.S. PATENT DOCUMENTS 3,372,691  3/1968  Shachar ............................... 126/900

Primary Examiner—Hiram Bernstein
Attorney, Agent, or Firm—Benjamin J. Barish

[57] ABSTRACT

A method of changing the salt content of a solution is described by including the salt in a nonconvective solar pond heated by solar radiation and having stable salt-concentration and temperature gradients increasing from the top to the bottom of the pond, the bottom layer of the pond being a substantially saturated solution at a predetermined temperature. A feed solution containing the salt is introduced directly into the bottom layer and is circulated through the bottom layer. The predetermined temperature of the bottom layer is different from the initial temperature of the feed solution when introduced into the pond bottom layer and is selected to effect a change in solubility, and thereby a change in the salt content, of the feed solution by causing salt in the feed solution to be precipitated therefrom, or additional salt to be dissolved therein.

Examples are described in which the solar pond is used for the production of sodium sulphate, dehydration of other salts, upgrading of Carnalite, production of potassium chloride, and production of various minerals from the Dead Sea.

29 Claims, 11 Drawing Figures

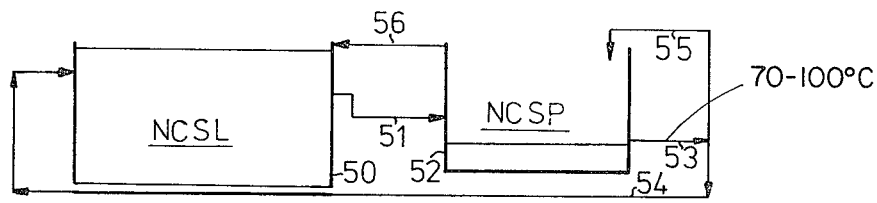
FIG. 8a
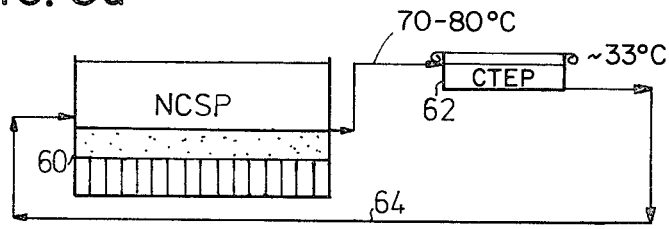
FIG. 8b
FIG. 9
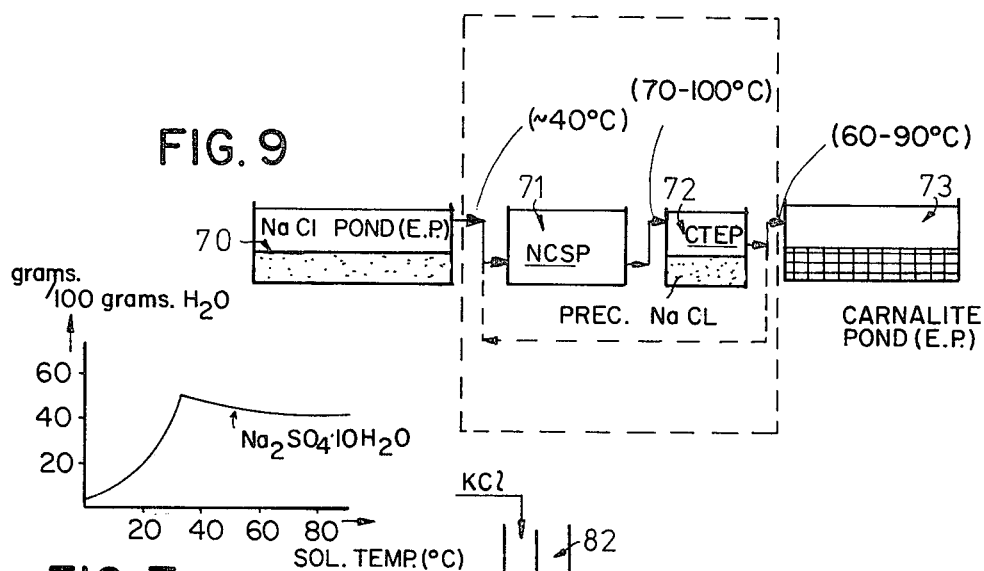
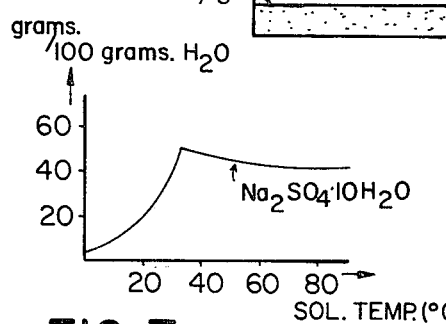
FIG. 7
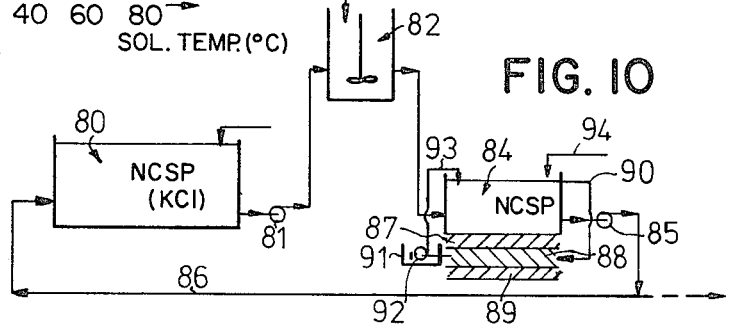
FIG. 10 ant in processes involving dissolution or precipitation of salts whose solubility varies considerably with temperature. In most cases, the solubility of salts in water increases with temperature. However, in some cases, the solubility decreases with temperature, and in still other cases, it increases with temperature in one range and decreases in another. Points of discontinuity in the relation between solubility and temperature usually coincide with a change in the hydration of the salts precipitating out of the solution.

METHOD OF UTILIZING SOLAR PONDS FOR EFFECTING CONTROLLED TEMPERATURE CHANGES OF SOLUTIONS PARTICULARLY IN PROCESSES INVOLVING THE DISSOLUTION AND/OR PRECIPITATION OF SALTS

BACKGROUND OF THE INVENTION

The present invention relates to methods of utilizing solar ponds for controlling the temperature of solutions. The invention is particularly applicable to the use of solar ponds in various industrial processes for promoting the dissolution of salts in a solution and/or the controlled precipitation of salts from a solution. When used for precipitating salts, the invention may also be applied for controlling the nature or form of the salts precipitated, for example, to obtain dehydrated salts or salts of predetermined crystal sizes, through the control of the solution temperature and the rate of temperature change.

The control of temperature, and the rate of its rise or fall in large bodies of salt solutions, is of great importance in some industrial processes, but in many cases it is not economically attainable. It is particularly important in processes involving dissolution or precipitation of salts whose solubility varies considerably with temperature. In most cases, the solubility of salts in water increases with temperature. However, in some cases, the solubility decreases with temperature, and in still other cases, it increases with temperature in one range and decreases in another. Points of discontinuity in the relation between solubility and temperature usually coincide with a change in the hydration of the salts precipitating out of the solution.

In the precipitation of salts whose solubility varies rapidly with change in temperature, the supersaturation of the solution required to cause precipitation is often obtained not by evaporation of the solvent, but rather by a change in its temperature, or by both. Also, the dissolution rate of such salts can be increased considerably by a suitable change in the solvent temperature.

In some industrial processes not only the temperature is important, but also the rate of its variation. This rate is particularly important in the precipitation of solutes when the product is required in the form of large compact crystals with a minimum of fine powder or skeleton crystals which are easily crushed into powder. Economically important examples of such products are potash and other solid fertilizers which are increasingly required today for reasons connected with modern application methods in the form of 2 to 4 mm. compact crystals, the market price for which is considerably higher than the price for their powder form.

It is well known that one condition for the formation of large compact crystals by precipitation from a supersaturated aqueous solution of hetropolar salts is that the rate of crystal growth must be slow. The rate of crystal growth is dependent on temperature and the composition of salts in the solution. That is, it is proportional to the degree of supersaturation of the solution around it which, in turn, depends on the rate of change of temperature, and/or the rate of solvent evaporation provided, of course, that the contact between the supersaturated solution thus obtained and the growing crystals is continuously maintained.

Because of the slow rate of crystal growth required for large-size crystals, very large volumes of solution must usually be processed for normal production capacities, and therefore the use of industrial crystalizers often becomes uneconomical. The only known method in which a very slow rate of crystal growth would not be economically prohibitive, is by the use of EP's, (evaporation ponds). However, insofar as we are aware, no method has yet been devised, applicable to the natural conditions, for adequate control of crystal size so that some salts (e.g. sodium chloride) are often obtained in the form of large crystals which are later ground while other salts (e.g., potassium chloride) required in the form of large crystals are precipitated in EP's as skeletons and small crystals which, in many cases, have to be later pelletized in expensive pelletizing plants to meet market demand for larger particles.

According to the present invention, solar ponds are utilized for controlling the temperature of solutions in order to accomplish many industrial processes including those mentioned above.

The term "solar pond" is commonly used to describe two types of ponds which are heated by solar radiations. The first type is known as an evaporation pond (or EP), in which various salt solutions are concentrated and/or salts are precipitated by the use of solar radiations for evaporating solvent from the pond. The second type is commonly called a non-convective solar pond (or NCSP) in which various salt solutions are heated to temperatures up to 100° C. and over, by establishing a stable concentration or density gradient which produces stable temperature gradient increasing from the top of the pond to its bottom. The bottom layer in the pond, which is usually darkened and of the highest salt concentration, absorbs the solar radiations reaching it while the loss of heat upwards is greatly reduced (in the absence of convection currents) because of the existence of the density gradient. NCSP's have been used mainly as large solar energy collectors wherein the heated bottom layer is circulated and utilized outside of the pond.

NCSP's have also been suggested for the dehydration of sodium sulphate and other salts in the pond. In this case, the suggestion is to add feed solution to the top of the pond, the bottom of the pond being heated by solar radiations to a temperature higher than the dehydration temperature while solvent is evaporated from the top, resulting in the precipitation of salt at the bottom of the pond where it is dehydrated. But, in this technique the whole pond becomes saturated. Such a pond can be maintained as an NCSP only when the density of the saturated solution continues to increase with temperature also at temperatures higher than the dehydration temperature, which is not the case with sodium sulphate (See FIG. 7). Furthermore, since the rate of evaporation of water from salt solution ponds decreases with the increase in concentration, the efficiency of utilizing solar energy for the evaporation of water from completely saturated ponds is usually low.

However, the NCSP can be used for trapping solar energy in the bottom layer and at the same time it can utilize additional solar energy as an evaporation pond in which the top layer of more dilute solution is concentrated, as long as the required density gradient in the non-convective layer of the pond is maintained.

The present invention uses NCSP's both as dissolution ponds to increase the salt concentration of a solution, and as precipitation ponds to precipitate salt from a solution. In both cases, the pond may be used for either raising or lowering the temperature of the solution for increasing or for decreasing the solubility of the solute, in accordance with the characteristics of the particular solution involved as discussed above. In addition, when the pond is used for precipitation, the temperature and the rate of its change may be controlled to determine the nature (e.g., dehydrated) and particle size of the precipitate. In both cases, the NCSP can also be used at the same time as an evaporation pond.

A third type of pond, which may be used in some applications of the present invention is the "controlled temperature evaporation pond" (or, CTEP). In the commonly used EP absorbing heat from solar radiations only, the temperature of a solution circulated through the pond is determined by the climatic conditions (i.e., ambient temperature), and is nearly independent of the pond size. However, when energy is added to the pond by introducing the solution at a high temperature and withdrawing it at a lower temperature, then the temperature of the pond can vary anywhere between the temperature of the introduced hot solution for a very small pond, to the ambient temperature for a very large pond. The surface area of the pond required to maintain a predetermined temperature of a given solution between the said limits, for a given circulation rate and climatic conditions, can be approximately calculated. In practice, the climatic conditions are not constant. The temperature of the pond will also fluctuate with the diurnal climatic cycle and other variations in the climatic conditions. However, if these variations during the same season are not extreme, and the pond is deep enough (a few meters), the solution temperature fluctuations remain within a few degrees Centigrade of the required temperature. Such a pond can be used, therefore, as an evaporation pond in which evaporation is carried out at an approximately predetermined temperature which is higher than the ambient temperature.

A more accurate control of temperature, and adjustment of the pond surface area to seasonal variations in climatic conditions, can be obtained by the use of a floating cover having a surface area predetermined according to the required temperature.

BRIEF SUMMARY OF THE INVENTION

According to a broad aspect of the present invention, there is provided a method of changing the salt content of a solution, comprising: establishing a non-convective solar pond (NCSP) including the salt, which pond is heated by solar radiation and has a stable salt-concentration gradient and a stable temperature gradient increasing from the top of the pond to the bottom thereof, the bottom layer of the pond being a substantially saturated solution at a predetermined temperature; introducing a feed solution containing the salt directly into the bottom layer and circulating same through the bottom layer; said predetermined temperature of the bottom layer being different from the initial temperature of the feed solution when introduced into the pond bottom layer and being selected to effect a change in solubility, and thereby a change in the salt content, of the feed solution by causing salt in the feed solution to be precipitated therefrom or additional salt to be dissolved in the feed solution; and withdrawing the resulting depleted or enriched feed solution.

According to another aspect of the present invention, the said NCSP is also utilized as an evaporation pond (EP).

According to a still further aspect of the present invention, the NCSP is used as a dissolution or heating pond while the precipitation of salt from the saturated bottom layer is carried out in a controlled temperature evaporation pond (CTEP).

Embodiments of the invention are described below wherein the NCSP is a dissolution pond in which said predetermined temperature of the pond bottom layer is selected to increase the solubility of the feed solution, and thereby to promote the dissolution of additional salt at the pond bottom in the feed solution as it is circulated through the pond bottom layer, the thus enriched feed solution being subsequently withdrawn from the pond.

Other embodiments of the invention are described below, wherein the NCSP is a precipitation pond in which the feed solution is a saturated solution and the predetermined temperature of the pond bottom layer is selected so as to decrease the solubility of the feed solution, and thereby to cause salt to be precipitated at the pond bottom, the thus depleted feed solution being subsequently withdrawn from the pond and the salt precipitated at the bottom of the pond being subsequently recovered.

The invention may be applied in applications wherein the predetermined temperature of the pond bottom layer is higher than the initial temperature of the feed solution when introduced into the pond bottom layer so as to effect the change in solubility by controlled heating of the feed solution as it is circulated through the pond bottom layer. The invention may also be applied in applications wherein the predetermined temperature of the pond bottom layer is lower than the initial temperature of the feed solution when introduced into the pond bottom layer so as to effect the change in solubility by controlled cooling of the feed solution as it is circulated through the pond bottom layer.

According to another aspect of the invention, there is provided a method for effecting a controlled cooling of a feed solution containing a salt, comprising: establishing a nonconvective solar pond including the salt, which pond is heated by solar radiation and has a stable salt-concentration gradient and a stable temperature gradient increasing from the top of the pond to the bottom thereof, the bottom layer of the pond being a substantially concentrated solution at a predetermined temperature; introducing the feed solution directly into the pond bottom layer; and circulating the feed solution through the pond bottom layer; said predetermined temperature of the pond bottom layer being lower than the initial temperature of the feed solution when introduced into the pond bottom layer to effect the desired controlled cooling of the feed solution as it is circulated through the pond bottom layer.

For purposes of example, the invention is described below with respect to the use of such ponds for: the mining of minerals (e.g., the production of sodium sulphate from Mirabelite); the dehydration of salts (e.g., Glauber salt); the upgrading of minerals (e.g., Carnalite); the growing of crystals (e.g. potassium chloride); and the improvement of mineral production (e.g. at the Dead Sea).

BRIEF DESCRIPTION OF THE DRAWINGS

The invention is herein described, by way of example only, with reference to the accompanying drawings, wherein:

FIG. 7 is a graph illustrating the variation in the solubility of sodium sulphate with temperature;

FIG. 8a illustrates a method of producing dehydrated sodium sulphate in accordance with the invention;

FIG. 8b illustrates a method of dehydrating Glauber salt in accordance with the invention;

FIG. 9 illustrates a method of upgrading of Carnalite in accordance with the invention;

FIG. 10 illustrates a method of producing potasium chloride in accordance with the invention.

DESCRIPTION OF PREFERRED EMBODIMENTS

The relationship between the temperature of the bottom layer in an NCSP, and the various factors effecting it, have been thoroughly analyzed in the literature (see Weinberg, H; Solar Energy, Vol. 8, No. 2, April 1964 from which FIGS. 1 and 3 appear, FIG. 2 being prepared according to the formulas therein; also Israel (Pat. No. 12,561 and U.S.A. Pat. No. 3,372,691).

These factors are mainly:
(1) the solar flux penetrating the surface of the pond;
(2) the climatic conditions affecting the pond surface, temperature and the initial temperature of the pond;
(3) the clarity of the liquid in the pond;
(4) the thermal properties of the soil;
(5) the depth of the pond and the thickness of the non-convective layer;
(6) the thickness of the mixed bottom layer;
(7) the thickness of the mixed top layer; and
(8) the rate of energy removal by the circulated bottom layer.

Of all these factors, the one most useful in the control of the average bottom layer temperature—in steady state operation—is the depth of the pond which, unless otherwise stated, is also taken as the thickness of the non-convective layer. This depth can be easily varied as required.

Figure 1:
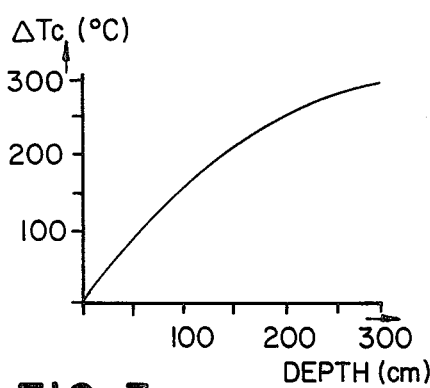
FIGS. 1–3 illustrate some of the known characteristics of non-convective solar ponds (NCSP's)
Figure 2:
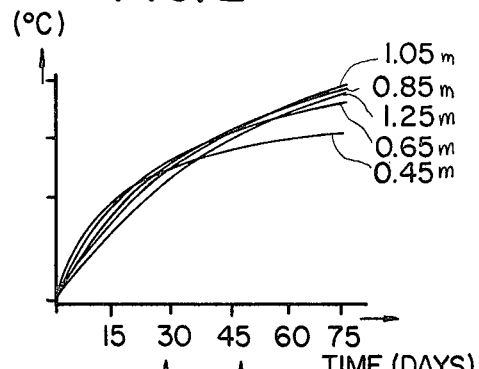

The general equation for the temperature distribution in the pond as a function of all the above listed factors would be too space-consumming for reproduction here. However, the effect of the pond depth on the bottom layer temperature—which is the important effect in the present invention—may be understood from FIGS. 1-3 of the drawings which all relate to average climatic conditions in Israel and to liquid clarity similar to that of average sea-water. FIG. 1 shows the mean steady state temperature rise above surface water temperature in an NCSP as a function of its depth; FIG. 2 shows the initial temperature rise at the bottom of an NCSP above surface water temperature as a function of time for different pond depths; and FIG. 3 shows the collection efficiency and optimum operating temperature as a function of the pond's depth.

Similar curves could be drawn, on the basis of the general equation given in the literature, for any other geographic and climatic conditions. The curves for practical use should be drawn not for average annual climatic condition, but for the monthly varying condition at the very least. However, the illustrated curves show clearly the dependency of the bottom layer temperature on the pond depth.

This characteristic of an NCSP, and the capability of adjustment of energy withdrawal rate, are used in the present invention for the controlled heating and the controlled cooling of concentrated salt solution, both being very important in various dissolution and crystalization processes in the chemical industry. This control is applied to fix the final temperature of the solution, and/or the rate of temperature variation.

Figure 3:
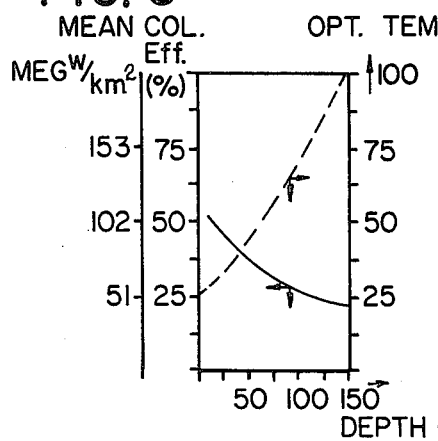

Thus, for example, if a concentrated solution is to be heated continuously from ambient temperature to 50° C. above ambient, the NCSP that should be chosen for maximum solar energy utilization efficiency, would be about 60 cms deep (see FIG. 3). The solution would be introduced into the bottom of the pond at one end, and withdrawn at the opposite end at the rate shown in FIG. 3 in terms of energy absorbed. This heating could be carried out in more than one step (or in more than one pond), in which case the corresponding pond depths should also be stepped to obtain maximum efficiency. For transient operation, the rate of heating could be increased considerably by using a pond which has already been heated previously to sufficiently high temperature, and/or by reducing the rate of energy withdrawl.

When controlled cooling of concentrated solution is required, both the final temperature and the rate of cooling of the bottom layer can be controlled by the choice of a suitable pond depth and suitable flow rate of the solution through the pond. Obviously when the NCSP is used for cooling, the depth of the pond should be small enough so that the bottom layer steady state temperature, under the prevailing conditions, is appropriately below the required final temperature of the solution flowing through the pond. It is also clear that the cooling rate increases with decreasing thickness of the non-convective layer, and flow rate, and vice-versa.

The cooling rate can also be increased by reducing the amount of radiation reaching the pond bottom layer by increasing the thickness of the mixed upper layer, and/or reducing the liquid clarity by controlled quantities of coloring additives, such as napthol-green, or similar coloring matter. The shape of the cooling curve resulting from one or more of these measures can be pre-calculated by available formulas.

In our above explanation of the use of an NCSP for controlling the temperature of large volumes of concentrated solutions, we have referred to average temperature under average Israeli climatic conditions as given in FIGS. 1-3. However superimposed on this average temperature is the diurnal cycle of temperature which, in a 1.0 m deep pond, may reach (under Israel summer conditions) an amplitude of 7° C. or even more. Such deviations from average temperature, and their effect on the rate of temperature variation may not be tolerable in many cases.

A similar diurnal cycle of temperature—although mostly of smaller amplitude—also occurs in ordinary EP's. This cycle, as we shall explain later, has limited their use, especially when precipitation of large crystals of certain salts is required.

It is therefore important that control be made possible not only of the average temperature of the bottom layer in an NCSP (this usually would not be under control in an EP) but also of the diurnal temperature variations.

The best way to dampen the amplitude of the diurnal variation of temperature in an NCSP is to increase the thickness of the mixed bottom layer. Ordinarily, a thin mixed layer is usually formed at the bottom of an NCSP mostly because of the intensity of the radiations during the miday hours. The thickness of this layer depends also on the available density gradient. In ponds built so far in Israel, it varies from between 10 and 20 cm. A 20 cm mixed layer would reduce the amplitude of the daily temperature variation to about half the amplitude of the bottom temperature in a pond where there is no such mixed layer, the density gradient starting right from the bottom and extending upwardly A further controlled increase of the mixed layer thickness in an NCSP has been obtained by raising the bottom layer outlet to the height of the required mixed layer, and by one or more of the following additional means:

(1) periodical increase of bottom layer circulation rate;
(2) the use of start stop pumping technique;
(3) insertion of flow barriers across the bottom layer flow; and
(4) the use of conventional mixing devices adapted to confined layer mixing.

Figure 4A:
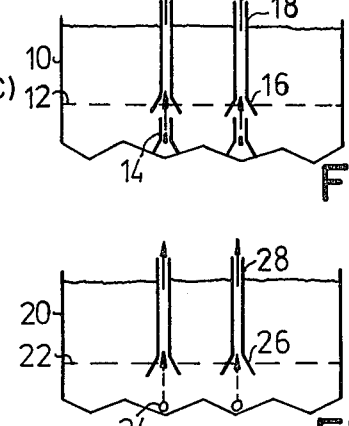
FIGS. 4a and 4b illustrate two methods which may be used to confine mixing to the bottom layer of such solar ponds.
Figure 4B:
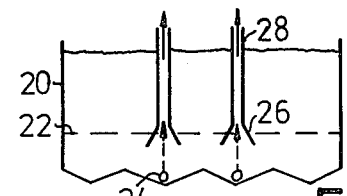

The latter is shown in FIGS. 4a and 4b. FIG. 4a illustrates a pond 10 having a bottom darkened layer 12 in which air guns 14 below the bottom layer inject air into the funneled ends 16 of a plurality of pipes 18 extending vertically through the pond to effect mixing by the air bubbles exiting around the funnels 16. FIG. 4b illustrates similar arrangement except that perforated pipes 24 located below the bottom layer 22 of the pond 20 are used to supply the air to funnels 26 of the vertically extending pipes 28.

The control of temperature and the rate of temperature change by the use of solar ponds opens a wide field of use of such ponds in various industrial processes, some of which hitherto were not economically feasible. Following is a general description of some of the processes to which the present invention is applicable and some specific examples of its utilization in industry.

Since the solubility of many salts varies considerably with temperature, more concentrated solutions could be obtained, and dissolution could be made more rapid, if carried out at the temperature of maximum solubility. In most aqueous solutions, the solubility increases with temperature, and therefore dissolution at as high a temperature as possible should be sought.

In the application of the present invention for the dissolution of salts, the solution is heated to an optimum temperature in an NCSP. Such dissolution of salts can be carried out in a number of different ways usually in the following steps:

(1) preliminary dissolution of the relevant salts and the use of the solution for the formation of an NCSP;
(2) operation of the pond by a method ensuring the maintenance of the required density gradient and the heating of the solution at the bottom layer to a predetermined optimum temperature;
(3) increasing the concentration of solutes in the heated solution by the dissolution of additional salts; and
(4) selective precipitation of one or more salts out of the solution.

The preliminary dissolution of salts required for producing the NCSP may be carried out in a mixer outside the pond, or it may be carried out in the pond.

In the first case the quantities of salts and water are adjusted continuously as required to obtain the planned concentration gradient in the pond. The solution may be introduced into the pond starting with the planned concentration of the bottom layer and gradually decreasing it to that of the surface layer when the pond is full, in which case the solution from the mixer is introduced horizontally into the pond at the liquid surface. The solution may also be introduced at surface layer concentration first, increasing gradually up to bottom layer concentration when the pond is full, in which case the solution is introduced horizontally at the bottom of the pond. In both cases excessive turbulence at the entry must be avoided.

When the preliminary dissolution of salts is carried out in the pond, the quantities of salts required for the formation of the NCSP are dumped into the empty pond and solvent water is then added. If excessive mixing is avoided, the concentration gradient typical to an NCSP will form eventually. However, this would be a very slow process and other methods for the rapid dissolution of the salts and formation of the required NCSP must be used.

A two stage method allowing a good control of the concentration gradient obtained in the pond would be as follows:

In the first stage, sufficient solvent water is added to form as concentrated solution as possible of all the salts required when the NCSP is full. This concentrated solution is obtained by vigorous mixing. Dissolution rate, at this stage, would be greatly increased if the salt in the pond is piled in high piles and not spread evenly over the pond floor.

In the second stage, after the salts in the pond have dissolved and the pond is partly filled with concentrated solution, the pump, which is usually installed for bottom layer circulation, is started to pump the concentrated solution through a mixing device—where fresh water (or dilute solution) is added—and to spread it over the liquid surface in the pond. The rate of fresh water flow into the mixer is gradually increased, and that of the concentrated solution is gradually decreased, as required to obtain the predetermined concentration gradient in the full pond.

Another way for building the concentration gradient in the second stage, which may be preferred when a circulation pump has not been installed, is to introduce the required quantity of fresh water directly into the pond in the form of jets spouting upwards, through the concentrated solution, from a preforated pipe laid at the bottom of the pond.

The required concentration gradient can then be obtained by a suitable choice of the number and the diameter of the holes in the pipe, by continuous adjustment of the flow rate, and/or by gradually raising the pipe, all of which can be approximately calculated for any pond depth and vertical concentration distribution by the use of established theories on the mixing and flow regimes of such jets. Additional adjustments should be made continuously during the filling operation as dictated by observations of the actual concentration obtained.

The depth of the pond should be chosen so as to give maximum dissolution efficiency. This depth can easily be determined from the solubility temperature curve of the salts to be dissolved, and the solar energy collection efficiency and temperature-depth curves for the pond at the prevailing local conditions, as those shown in FIG. 3 for average Israeli conditions. Since the optimum depth increases with the temperature of the bottom layer, it would obviously be more efficient to start operation with a shallow NCSP and increase its depth gradually as the temperature of the bottom layer rises. This may have to be done anyway when the concentration of solutes in the solution at ambient temperature is not sufficient for obtaining the minimum gradient required for stability (about 0.002 gr/cm$^4$) at the final planned depth.

Once the NCSP has formed, and the temperature of the bottom layer has reached the optimum dissolution temperature, the pond would be operated to provide full utilization of the solar energy absorbed for the required dissolution of salts and the maintenance of a stable concentration gradient.

The dissolution of additional salts by the heated bottom layer can be carried out in the pond if the salts are spread over the bottom of the pond before the pond is filled, or if they are added later in the form of slurry, or in any other way. A special case of this type is a pond formed over a natural soluble mineral deposit which is thus mined by dissolution in water. The dissolution of additional salts may also be carried out outside the pond, in which case the pond would be used only for heating the solution to optimum temperature.

In many cases dissolution of salts would be but one step in a salts separation and/or purification process followed by selective precipitation of one or more salts. The cycle of operation in such process would then include the following steps: heating the solution in the bottom layer of an NCSP to optimum temperature; additional dissolution of the required salts; selective precipitation of one or more salts by the evaporation of solvent and/or controlled change in the solution temperature; and return of the depleted solution to the pond. Some blow down of the circulating solution would probably be included in order to keep the concentration of the unextracted salts below prescribed limits.

Such a cycle of operations would allow the maintenance of the required concentration gradient by the "Counter-flow Stabilization Method" described in U.S. Pat. No. 3,372,691. In this cycle, the rate at which hot solution is withdrawn from the pond at one end is higher than the rate at which the depleted solution is returned to the pond at the opposite end. A downward flow of the liquid in the pond will therefore be induced while the concentration of the bottom layer would remain constant. Such downward flow, if properly adjusted, as explained in this patent, would balance the diffusion of salts upwards and ensure the maintenance of the concentration gradient in the pond.

In some processes where dissolution is carried out in the pond, sufficiently concentrated solution for recycling along the bottom of the pond may not be available. The rate of the pond's liquid downward flow, induced by the withdrawal of hot solution, would then be greatly increased. The maintenance of the concentration gradient would then depend on a corresponding increase in the upward diffusion of salts by controlled vertical mixing. Some means for such mixing are described in the above-cited patent. However, the method which seems to be most suitable in this case is that of adding the required quantities of solvent water, not at the surface of the pond, as therein described, but rather through preforated pipes laid at the bottom of the pond as explained previously. Additional means for adjusting the mixing rate and the vertical concentration distribution should preferably be also installed. These may include: means for varying the angle at which the jets, from the preforated pipe, enter the solution (by turning the pipes); a plurality of air guns if the pond is very large; and other known means for controlled vertical mixing.

The present invention has a wide application not only in the dissolution of solutes, but also in their precipitation out of the solution. The precipitation of salts out of solution is caused by the supersaturation of the solutions in respect to these salts, the supersaturation being usually obtained by evaporation of solvent and/or change of its temperature. The choice of precipitation methods is often determined by the need for selectively precipitating one or more solutes from a multi-solutes solution and for avoiding their contamination by the precipitation of other solutes. In such cases, temperature changes may have to be kept within predetermined limits. Other processes in which precipitation must be carried out within a predetermined range of temperatures are those involving the precipitation of partially or fully dehydrated salts. In other cases—such as precipitation of large crystals—it is the rate of cooling which is most important. In all these cases, precipitation by controlled cooling (or heating) in an NCSP or by evaporation at controlled temperature in a CTEP may well be the most economical methods.

Figure 5:
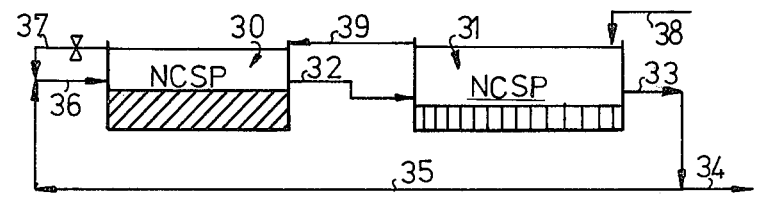
FIGS. 5 and 6 illustrate two basic flow diagrams for utilizing NCSP's for the dissolution and precipitation of salts in accordance with the present invention.
Figure 6:
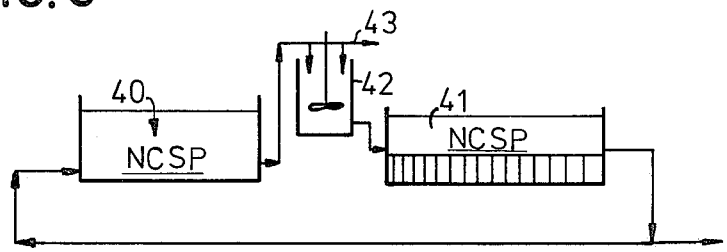

The principles of the dissolution and precipitation of salts in NCSP's when their solubility and saturated solution density increase with temperature, is shown schematically in FIGS. 5 and 6.

Thus, as shown in FIG. 5, a first NCSP 30 is used as a dissolution pond, wherein the thickness of the non-convective layer, the area of the pond, and the other variable factors which determine the bottom layer temperature as explained previously, are such as to cause the bottom layer to be heated by solar radiations to a first temperature as near as practical to the maximum solubility temperature (see also FIG. 3). A second NCSP 31 is used as a precipitation pond, wherein the pond factors are such as to cause the temperature of the bottom layer, consisting of the hot solution transferred from the first pond via duct 32, to be lowered to a second temperature, thereby causing salt to be precipitated at the bottom of the second pond from where it is later recovered.

As indicated above, the bottom layer of pond 31 could be at a lower temperature than that of the feed solution whereby precipitation would be effected by cooling, or it could be at a higher temperature whereby precipitation would be effected by heating, depending on the solubility characteristics of the salt involved. While precipitation of salt, when effected by cooling of a hot saturated solution, can be carried out in ordinary evaporation or cooling ponds, the use of an NCSP supplies the means for controlling the precipitation temperature and rate so as to control the nature of the precipitated salts as described above. Thus, by appropriately selecting the temperature, the bottom layer may be used for precipitating dehydrated (completely or partially) salts; and by controlling the rate of temperature change, it may be used for precipitating large sized crystals of heteropolar salts.

The solution is withdrawn from the bottom layer at the opposite end of pond 31 via duct 33. Some is discharged as blowdown via duct 34, and the remainder is recirculated back via ducts 35 and 36 to the bottom layer at the inlet side of pond 30, where it is reconstituted with approximately the initial salt concentration and temperature before being returned to the bottom layer of pond 31 via pipe 32.

Controlled amounts of dilute solution from the top layer of pond 30 is also added via pipe 37 of inlet 36 and mixed with the recirculated solution in order to maintain a stable gradient. Further, make-up water or dilute solution is added to the ponds, first via pipe 38 to the top of pond 31, and then via pipe 39 to the top of pond 30, to cover solvent losses and to maintain the required liquid level and concentration therein.

In FIG. 5, pond 30 includes the salt which is either found therein as a natural deposit, or which has been merely dumped into the pond. FIG. 6 illustrates a variation, wherein the first pond 40 is used to heat the solvent or solution to the temperature of maximum solubility of salt, and the solution is then concentrated with the salt by means of a mixer 42 between the heating pond 40 and the precipitation pond 41, the salt being added to the mixer via inlet 43.

The actual operating conditions of the flow diagrams of FIGS. 5 and 6 should of course be adapted in each case to the special characteristics of the solutions involved and the special requirements of the process. Some examples of the application of the present invention in various actual industrial processes are given below. While each of these examples presents a novel industrial production process, these examples are also intended to demonstrate how the basic concept of this invention may be adapted to different solute characteristics and different requirements.

EXAMPLE 1: PRODUCTION OF SODIUM SULPHATE ($Na_2SO_4$)

One example wherein NCSP's might be used to improve production processes in various stages, is the production of sodium sulphate.

A large part of world supply of sodium sulphate is produced from natural deposits of mirabelite ($Na_2SO_4.10H_2O$) or brines containing sodium sulphate together with other salts. The production process usually includes one or more of the following operations:

(1) dissolution of the raw minerals, sometimes used as the mining method;
(2) separation of various salts from the solution by selective precipitation of the mirabelite; and
(3) dehydration of the mirabelite (or "Glauber salt") which contains 55.9% water.

An NCSP may be utilized to advantage in each of these operations. Operations (1) and (3) may well be improved in a process such as that presently used in the "Saskatchewan Minerals" plant in Canada. In this plant a large area of the mirabelite deposit is flooded—after the winter ice has thawed—with a shallow layer of water which dissolves the minerals. However, as the solubility of sodium sulphate is very small at low temperatures (see FIG. 7), it is not before late summer, when the temperature of the water rises to nearly 30° C., that a sufficiently concentrated solution is obtained which is then pumped to the precipitation pond. The water in this shallow lake then cools again, and no more solution can be obtained until the next summer. Although a very large area of deposit is thus flooded every summer, this step forms the bottle-neck in the production capacity of the plant.

In this dissolution process, only a very shallow layer of water is allowed so that it can be properly mixed by the wind and by tracked vehicles. Without such vigorous mixing, a thin layer of concentrated solution is formed at the bottom of the lake causing sharp stratification and retarding further dissolution.

In the precipitation pond the solution is cooled during the autumn, and Glauber salt is precipitated while the remaining solution is returned, just before winter freeze sets in to the dissolution area. In the next spring and summer, the Glauber salt is harvested by mechanical equipment and sent to the plant where it is crushed, melted and dehydrated by evaporation, classification, centrifugation and drying.

To apply the present invention to this process, it would be modified as shown in FIG. 8a, as follows:

(a) The Dissolution Stage: The deposit area—provided with a drainage system designed to drain all the solution into a collection trough—would be flooded with a well mixed layer of water (20–25 cms deep) and left to warm up, as in the present process. However, when its temperature has reached about 10° C., the concentration of the solution would be sufficient to form a stable NCSP 50, 40 to 50 cms deep by the methods described previously. Once the NCSP has formed, the bottom layer temperature would rise very quickly to 33° C. At this point the dehydration of the mirabelite will start, and a further rise in temperature will probably be arrested. At this temperature, the solution at the bottom of the pond reaches maximum concentration (about 34%). As the temperature rises, the concentration and density gradients in this non-convective solar lake (NCSL) also increase, and the depth of the lake can then be adjusted for maximum solar energy collection efficiency. The concentrated bottom layer can now be withdrawn via duct 51 at the maximum rate allowed at this required operating temperature, provided that the concentration gradient is maintained, e.g., by recirculation of the bottom layer, by introduction of solvent water through perforated pipes laid at the bottom of the lake, and/or by any of the other means for the maintenance of the gradient as explained previously.

Assuming a low average radiation intensity of 4000 Kcal/$m^2$ day for five summer months, collection efficiency of only 25% and high energy consumption of 200 Kcal/Kg of $Na_2SO_4$ dissolved (including the heating of the solution to 33° C.), the output of the dissolution NCSL will be in the order of 750 Kg per square meter of the lake's area per season as compared to a maximum of 50 Kgs in the present process.

(b) The Precipitation Stage: Since the solution from the dissolution lake is saturated at the temperature of maximum solubility, the precipitation of the sodium sulphate can be effected by evaporation and/or by cooling or heating of the solution. The choice of the most suitable method in each case would depend on the composition of the salts in the solution and on the local condition. In some cases, selective precipitation may be carried out by alternately using one method to precipitate one or more solutes, and then another method for the precipitation of one or more other solutes.

In the above-mentioned Canadian process, the precipitation of dehydrated sodium sulphate can be effected by heating the saturated solution (withdrawn via duct 51 from the dissolution lake 50 at approx. 33° C.) to a higher temperature (say, between 70° C. and 100° C.)

in an NCSP 52. In such a process, the saturated solution from the NCSL is introduced into the bottom of NCSP 52 (produced from the same solution) at one end (duct 51) and withdrawn from the opposite end (duct 53). During its passage through the pond, the solution is heated to an optimum higher temperature resulting in the precipitation of some sodium sulphate (see solubility curve in FIG. 7). The solution is then returned to the bottom of the dissolution lake 50, via pipe 54, where its heat is utilized in the dissolution of the Mirabelite deposit. Some blow-down may be required in this cycle in order to keep the concentration of other solutes in the solution within required limits.

Solvent water would have to be added to cover evaporation and blow-down losses. The water many be added (e.g. via ducts 55, 56) to the surface or the bottom of pond 50 as may be required for the maintenance of the concentration gradients in both lake 50 and pond 52 by known methods described previously.

Because the density of the saturated solution in the bottom of both the NCSL 50 and the NCSP 52 is rather high (1.344 gr./Cm$^3$ at 33° C. going down to 1.26 gr./Cm$^3$ at 90° C.), the concentration of the surface layer in both could be allowed to increase as long as the stability of the density gradient is assured. However, this stability would not be assured if the concentration of sodium sulphate in the surface of the NCSP 52 is allowed to reach saturation, as it is in previous proposals to use Solar ponds for dehydrating salts.

When a sufficient quantity of sodium sulphate has accumulated in the pond, it can be harvested and pumped in the form of hot slurry (or conveyed in solid form) to the plant for dewatering (in settlers and/or centrifuges) and for drying to obtain the final product.

While this process for the precipitation of sodium sulphate entails the recirculation of large quantities of solution which is not required at the present process of precipitation by cooling, it has the advantage of direct precipitation of the unhydrated salts, thus saving considerable cost in energy and equipment.

In some cases precipitation of Glauber salt ($Na_2SO_4 \times 10H_2O$) from the NCSL solution by cooling may be preferred in order to avoid contamination of the sodium sulphate by other solutes contained in the solution. In such cases the NCSP may be used to dehydrate the Glauber salt thus obtained.

FIG. 8b illustrates a process for the dehydration of Glauber salt in an NCSP. The NCSP, therein designated 60, would be formed over the precipitated Glauber salt as the NCSL is formed over the Mirabelite deposit in FIG. 8a. The bottom of this pond 60 is heated by solar radiations melting the Glauber salt. About 40% of the sodium sulphate contained in the Glauber salt remains on the bottom of the pond as solid dehydrated sodium sulphate, while the rest is dissolved in the water of crystalization to form a saturated solution of sodium sulphate.

During this stage of the operation, the temperature of the bottom layer in the pond will remain at about 33° C. until the Glauber salt has melted. After that the temperature would continue to rise (say up to 80° C.) and the pond would be used as the heating pond, described previously, heating the saturated solution added to the bottom of the pond by the melting of the Glauber salt. This heated solution may be outletted at a temperature of 70°–100° C. and would be concentrated by evaporation in a small controlled temperature evaporation pond (CTEP) 62 or in an evaporator the temperature in which should not be allowed to drop below 33° C. It would then be returned to the NCSP 60 via duct 64 for re-heating, as a result of which additional dehydrated uncontaminated sodium sulphate would be precipitated. This pond 60 should be drained before winter cold weather and reduced solar radiation would cause the bottom layer temperature to drop below the dehydration temperature of 33° C. The precipitated sodium sulphate is then harvested and dried.

EXAMPLE 2: DEHYDRATION OF OTHER SALTS

Many salts which are precipitated from supersaturated solution in their hydrated form at ambient solution temperatures would be precipitated in their unhydrated, or less hydrated, form at higher temperature. The NCSP could be used for the dehydration of such salts by a process including the following steps:
(1) forming an NCSP with the solution from which the salt is to be precipitated;
(2) heating the solution to a temperature higher than the dehydration temperature;
(3) saturating the solution at this higher temperature by the addition of solutes or by evaporation, which may require one or more passages through the NCSP; and
(4) precipitating the fully or partly dehydrated salt by evaporation and/or cooling (or heating, if the solubility decrease with temperature) carried out at temperatures above the dehydration temperature in an NCSP or CTEP.

One example of such operation was included in the production process of sodium sulphate described previously.

Another example is the partial dehydration of the fully hydrated sodium tetra borate ($Na_2B_4O_7 \times 10H_2O$) which is transformed to $Na_2B_4O_7 \times 5H_2O$ at a temperature of about 65° C. while its solubility in water increases with temperature up to its boiling point.

The partial dehydration of this salt may be obtained by heating its concentrated solution in NCSP to a temperature considerably above 65° C. (say 90°–100° C.) and then precipitating it by simultaneous evaporation and cooling to a temperature slightly above 65° C. (e.g. up to 78° C.).

Still another example would be the nearly complete dehydration of Epsom salt ($MgSO_4 \times 7H_2O$). This salt is transformed to $MgSO_4 \times 5H_2O$ at about 50° C. and to $MgSO_4 \times H_2O$ at about 67° C. which is also the temperature of maximum solubility. In this case, therefore, saturation would be obtained at a temperature of 67° C., and the precipitation of $MgSO_4 \times H_2O$ may be carried out by heating the saturated solution up to 90° C. or 100° C., the solubility of MgSO being thus reduced from the maximum of about 58% at 67° C., to about 48% at 100° C. This salt can also be precipitated in its hydrated form by cooling in an EP and then dehydrated as described previously for sodium sulphate.

EXAMPLE 3: UPGRADING OF CARNALITE

The possibility of heating cheaply large quantities of concentrated solutions in NCSP's adds a new dimension to the consideration of various salt solubility phase diagrams to enable the mass production of comparatively cheap minerals. Generally, only ambient temperatures phase diagrams were heretofore considered in the planning of selective precipitation process of such minerals in ponds. The use of NCSP now allows the parameter of temperature to be also included in the choice of suitable precipitation processes. A good example of the possibilities for improving precipitation processes opened up by the use of NCSP is its utilization for upgrading Carnalite.

In Israel, potassium chloride fertilizer is produced from Dead Sea brine which is saturated with sodium, magnesium, calcium and potassium chlorides. In this production process sodium chloride is first precipitated by evaporation in "Salt Ponds." This evaporation step is continued until the brine reaches a density of 1.29–1.30 gr/cm$^3$ when further concentration would also cause precipitation of Carnalite to begin. At this "Carnalite Point," the brine is transferred to "Carnalite Ponds" where further evaporation causes continued precipitation of sodium chloride together with Carnalite ($MgCl_2 \times KCl \times 6H_2O$) from which potassium chloride is produced. The evaporation in the Carnalite ponds continues until a density of about 1.34 gr/cm$^3$ is reached, by which time about 75% of the potassium chloride has precipitated as Carnalite while about 25% remains in the "end brine". The latter cannot be further concentrated in the Carnalite ponds at the prevailing climatic conditions and therefore is returned to the sea.

While the separation of the potassium chloride from the magnesium chloride in the Carnalite double salt is comparatively easy, its separation from the sodium chloride, which contaminates the Carnalite, is much more difficult, involving additional floatation or selective precipitation steps which increase considerably the production cost.

This process may be considerably improved in accordance with the present invention, by turning the first of the Carnalite ponds (or part of it) into an NCSP (to be formed from the same brine) and adding to it a small EP. FIG. 9 illustrates a process that could be used.

Thus, as shown in FIG. 9, the brine from the salt ponds 70 is circulated along the bottom of the NCSP 71 and heated from its ambient temperature of 30°–40° C. to a sufficiently higher temperature (say, between 70° and 100° C.). From the NCSP 71 the brine is conveyed to a small CTEP 72 or crystalizer, in which a temperature higher than ambient temperature is maintained. Because the solubility of both the magnesium and potassium chloride increases with temperature more than that of sodium chloride, the supersaturation of the brine by evaporation at a higher temperature would result in the precipitation of additional sodium chloride before Carnalite precipitation is begun. The higher the temperature, the less sodium chloride remains in the solution to be precipitated at the Carnalite ponds 73 to which the brine from the CTEP 72 is transferred as soon as the new "Carnalite point" is reached. Saturating this brine at 80° will result in a nearly complete precipitation of the sodium chloride before the "Carnalite point" is reached, thus avoiding completely the need for the sodium chloride separation plant or, at least, reducing considerably its size.

EXAMPLE 4: PRODUCTION OF POTASSIUM CHLORIDE

As stated previously, many minerals are often required in the form of small compact particles of a given size range which for potassium chloride (KCl) is between 2 and 4 mm. Efforts made by various producers to obtain such particles of KCl by precipitation of EP's, have not been successful so far, and the product obtained in such ponds is mostly in the form of fine powder as is also the case with other hetropolar salts whose saturated solution density increases rapidly with rise in temperature.

A study of such processes verified by laboratory and field experiments in the precipitation of KCl has shown that compact crystals of the above-mentioned salts do not grow in EP's for one or more of the following reasons;

(1) Because of the increase in solubility with temperature; the solution in an EP usually becomes undersaturated when the pond is heated during the daytime, and supersaturation resulting in the precipitation of solutes (although basically due to evaporation of the solvent water) takes place only during a short interval of time when the temperature of the solution is near its diurnal minimum. Crystalization rate of KCl is therefore more rapid than that of salts whose solubility does not increase, or increase less steeply, with temperature and their precipitation is spread over a greater part of the diurnal cycle. In experiments with the precipitation of KCl in EP's at Sdom (Israel) in the summer months, linear crystallization rate was much greater than 10 $\mu$/hour which was found to be approximately the maximum rate for compact crystal growth at the prevailing ambient solution temperatures (between 25° and 35° C.).

(2) It has also been found that when the bottom of the pond is covered with precipitated crystals, they are partly redissolved during the day as the bottom of the pond is heated by solar radiation, causing the formation of a stagnant stratified bottom layer of solution which is warmer and denser than the bulk of the solution over it, thus cutting off its contact with the precipitated crystals and preventing their growth.

Also as a result of cooling of the pond surface during the night, and the beginning of crystalization, the surface layer becomes lighter than the bulk of the solution. In the absence of appreciable mixing by wind, a stratified upper layer is also thus formed covered by rapidly growing skeleton crystals held up by surface tension.

As a result of the precipitation processes described above, crystals of KCl (and other solutes whose saturated solution has a density which increases with temperature) do not ordinarily grow in EP's. They could be made to grow if forced mixing is continuously maintained, if the diurnal temperature amplitude is sufficiently restrained (by using a deep enough pond or other known measures) and if the rate of evaporation is not too rapid. These measures are expensive and they reduce considerably the yield per unit area of the pond.

These difficulties, however, are avoided, and the yield per unit of pond area considerably increased, by utilizing NCSP's in accordance with the present invention.

In this process, use is generally made of two NCSP's. One such pond is used for heating the solution to a temperature as nearly as practical to maximum solubility temperature (say, in the case of KCl, to between 60° and 100° C.), and saturating it with the required solutes. The other NCSP is used for the precipitation of the required solutes by controlled cooling.

A typical flow diagram of this process, designed for growing KCl crystals to the required size, is shown in FIG. 10. In this process an NCSP is filled with an aqueous solution of KCl (or Carnalite) saturated at the bottom and with very low concentration at the surface.

The bottom layer in this pond is heated by solar energy to a temperature reasonably higher than the ambient temperature. This hot solution is withdrawn from the pond by pump 81 to a mixer 82 where it is saturated with KCl, and is then introduced into the bottom of another NCSP 84 designed to have a bottom layer temperature lower than that of said hot solution. The hot solution flows along the bottom of the pond 84 and is then withdrawn by pump 85 and recirculated via duct 86 into the far end of pond 80 to be reheated and then resaturated.

The cooling of the hot saturated solution flowing along the bottom of pond 84 is effected by conduction of heat upwards through the stagnant non-convecting layer of solution above it to the surface of the pond where it is dissipated to the atmosphere. The cooling is also effected by conduction of heat to the soil below. At a given bottom layer temperature the rate of heat loss upwards, in steady-state operation, is nearly inversely proportional to the thickness of the non-convecting layer of solution in the pond. The rate of heat loss to the ground, however, is quickly reduced as the soil temperature rises so that in steady-state operation, it is reduced to zero unless a heat sink—mostly in the form of flowing ground water exists in the soil not too far down from the bottom of the pond.

One condition for the growth of comparatively large compact crystals of KCl in such a pond is that the tendancy for stratification of the flowing bottom layer (which develops when the bottom is covered with precipitated crystals and where the heat loss is mainly upwards) is overcome, and that this saturated layer remains mixed. This is ensured either by confined mixing of the saturated layer or, as preferred in the flow diagram of FIG. 10, by ensuring that heat loss downwards is greater than the heat loss upwards, the rate of the sum of both being kept below the maximum permissible for compact crystal growth.

The loss of heat downwards may be obtained by the utilization of an existing natural heat sink in the ground like flowing ground water, in which case the rate of heat loss is fixed by the initial adjustment of the distance between the heat sink and the bottom of the pond. It may also be obtained by introducing a permeable layer below the bottom of the pond through which pond surface water is circulated, as shown in FIG. 10. A pond construction suitable for this purpose is described in Israeli Patent Application No. 55479. In such a construction, the bottom of the pond consists of three layers: a top impermeable layer, an intermediate permeable layer, and a bottom impermeable layer. These layers are marked 87, 88 and 89, respectively; in FIG. 10. Cooling water is withdrawn from the surface of the pond and introduced via pipe 90 into the permeable layer 88 at one end of the pond and flow along its length, in a direction opposite to the flow of the bottom layer, to drain into a sump 91 at the other end. The water is then pumped by pump 92 and duct 93 back to the surface of the pond where it is cooled again before reaching the other end of the pond. Make-up water is added via pipe 94 from the latter end of the pond.

EXAMPLE 5: IMPROVEMENT OF MINERALS PRODUCTION AT THE DEAD SEA

As explained previously in Example 3, production of minerals contained in the Dead Sea brine begins with the precipitation of sodium chloride and then Carnalite in evaporation ponds. On an annual basis, the efficiency of solar energy utilization for the evaporation of water in the ponds varies from approximately 50% in the first salt precipitation pond, to less than 20% in the Carnalite precipitation ponds. It has also been explained in the maximum density of the brine obtained in the last Carnalite pond is approximately 1.34 Kgm/lit., and this "end brine" is returned to the Sea still containing a considerable part of the potassium chloride (which is the main product of the "Dead-Sea Works" today) and most of the magnesium chloride (which is not being utilized in the present process.)

The application of the present invention to these precipitation processes, and particularly the combination of a large NCSP with a small CTEP, can accomplish the following: improve considerably the solar energy utilization efficiency; increase the quantity of potassium chloride precipitated from the same total pond area; allow further concentration of the brine with the additional precipitation of bishofite ($MgCl_2.6\ H_2O$); and provide highly concentrated brine which can be utilized for the production of mechanical and electrical power.

In this application of the invention, all the present EP's would be turned into large NCSP's, utilized also as EP's, each large NCSP being paired with a small CTEP.

Figure 11:
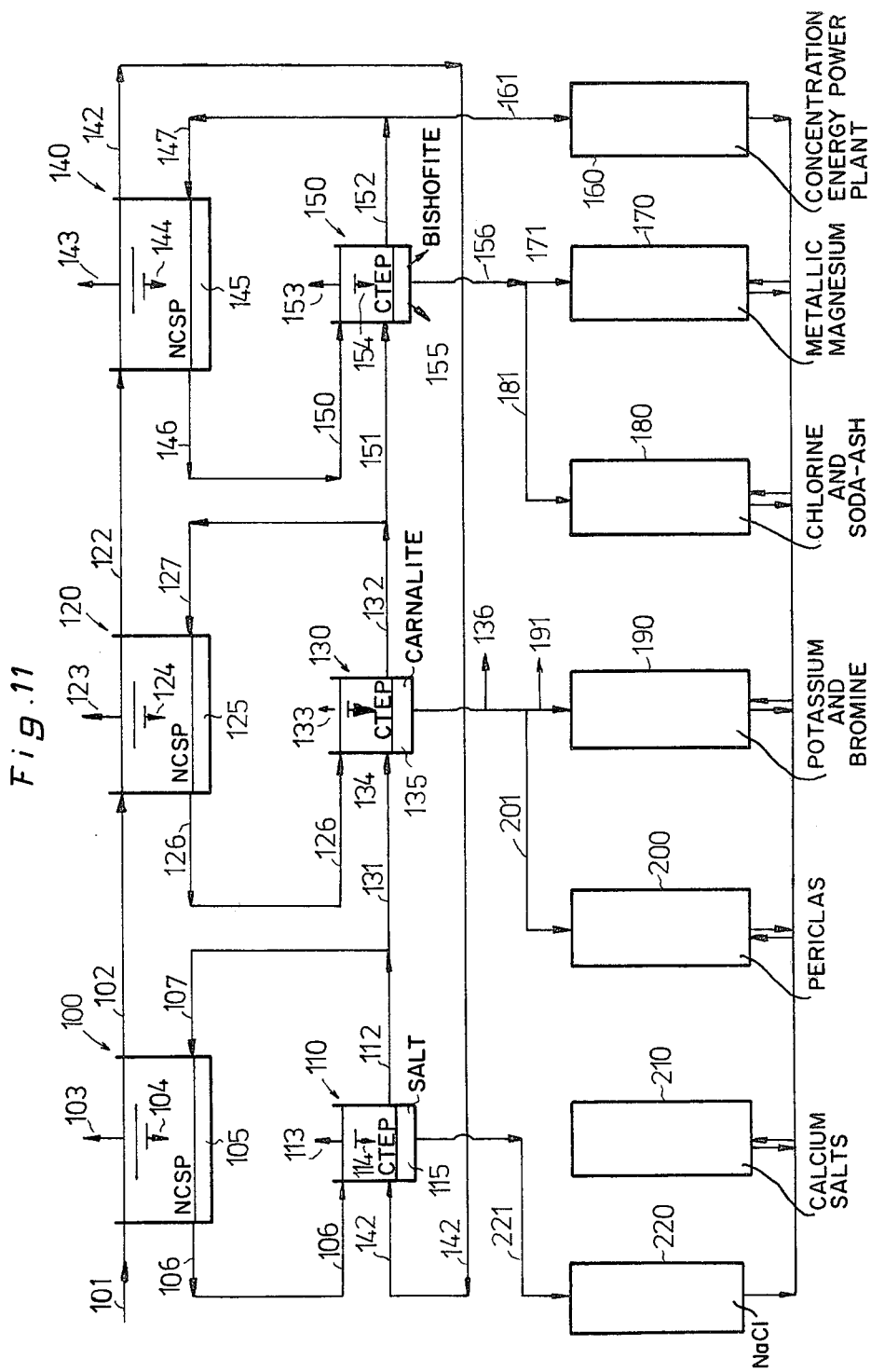
FIG. 11 illustrates a method in accordance with the invention for extracting a number of salts from Dead Sea brine.

A process flowsheet with three such pairs, including a material and energy balance for one liter of Dead Sea brine entering the plant, is shown in FIG. 11 and Table 1 wherein the temperatures and densities of the various brine streams at average summer conditions at the Dead Sea are also given.

Dead Sea brine is introduced (stream 101) to the surface of the first NCSP-EP 100 where it is concentrated by evaporation from a density of 1.23 Kgm/lit. to a density of 1.25 Kgm/lit. and then transferred (stream 102) to the surface of the second NCSP-EP 120. To effect the said concentration, 150 grams of water are evaporated (arrow 103) for every liter of the Dead Sea brine which will also result in the precipitation of 28 grams of NACl (104) to the bottom 105 of the pond. The bottom layer of brine in the pond (the density of which is approximately 1.34 Kgm/lit.) is circulated continuously through the CTEP 110 entering pond 100 (stream 107) at a temperature of approximately 80° C. and leaving it (stream 106) at a temperature of approximately 100° C. at nearly the same density.

In addition to stream 106 entering CTEP 110 from NCSP 110, pond 110 receives make-up brine (142) from the top of the last NCSP (140), entering at 36° C. and a density of 1.29 Kgm/lit. In this pond the hot stream from the NCSP supplies most of the heat for the concentration of the make-up brine (a small part is solar energy absorbed in the pond) by the evaporation of 50 grams of water (113) for each liter of Dead Sea brine accompanied by the precipitation of 8 grams of NACl (114).

The brine stream (112) withdrawn from CTEP 110 is split into two. One stream (107) is recycled to NCSP 100 and the other (131) supplies the make-up brine to the next CTEP 130. The similar cycles in the other two pairs of NCSP and CTEP are easily understood from the flowsheet.

As shown, the densities of both the surface and bottom layers of the NCSP's increase gradually from the first pair of ponds to the last pair. However, the rate of flow of the Dead Sea brine into the plant (101) and its residence time in the NCSP's must be adjusted so that the brine stream (142) coming out of NCASP 140 is at the "Carnalite Point" according to the prevailing ambient temperature at the surface of this pond. At a temperature of 36° C., which is approximately the average summer temperature at the surface of an NCSP such as 140 at the Dead Sea, the "Carnalite Point" of the concentrated Dead Sea brine is approximately at a density of 1.29 Kgm/lit. At 80° C., the "Carnalite Point" is at a density of 1.34 Kgm/lit., and the "bishofite point" (the density at which bishofite starts precipitating) is at a density of approximately 1.38 Kgm/lit. These are the densities of the brine kept in CTEP 110 and 120 respectively, so that sodium chloride only is precipitated in the first, and nearly pure Carnalite in the second, while bishofite ($MgCl_2.6H_2O$) is precipitated only in the third CTEP (150).

The brine withdrawn from the last CTEP (152) is also split into two. One stream (147) is recycled to the bottom layer of NCSP 140, while the other stream (161) is the "end brine" of the minerals production process. This stream of highly concentrated brine can be used for the production of power by one of the known methods for the utilization of the concentration energy of salt solutions. The precipitated salts are harvested and transferred to the various plants in which such salts are utilized, as schematically shown in FIG. 11.

During the winter, the optimum temperature of the bottom layer of the NCSP's would probably be lower than the given summer temperature, and the densitities of the brine in the CTEP's would have to be lowered also so that the brine is kept at the required Carnalite and bishofite points at CTEP 110 and 120, respectively.

Calculations of the sea of the NCSP's and the CTEP's required to maintain the necessary evaporation and the required temperature show that: (a) the utilization efficiency of solar energy for evaporation of water from brine in the combination NCSP-EP's and CTEP's shown is greater per unit pond area by 10% than in the present salt ponds, and by 50% than in the present Carnalite ponds; and (b) the total CTEP's area will be less than 1% of the total NCSP's area.

The application of this invention to the production of minerals at the Dead Sea will allow the concentration of the same quantities of Dead-Sea brine in the same total pond area utilized today to a density of 1.41–1.42 Kgm/lit. (at 80° C.) instead of to a density of 1.34 Kgm/lit. (at approximately 40° C.) achieved today. This would increase considerably the quantities of Carnalite precipitated, adding precipitated bishofite which cannot be precipitated at the EP's most the year, and supplying large quantities of a highly concentrated solution for production of mechanical and electrical power.

While the invention has been described with respect to a number of preferred embodiments, it will be appreciated that other applications of the invention may be made.

TABLE 1

(FIG. 11)

| POND | STREAM NO. | DENSITY TONS/M³ | TEMPERATURE °C. | WEIGHT PER M³ DEAD SEA FEED BRINE - KGS | COMMENTS |
|---|---|---|---|---|---|
| 100 | 101 | 1.23 | 30 | 1230 | Dead-Sea feed brine-IN |
|  | 102 | 1.25 | 32 | 1050 | Preconc. upper layer-OUT |
|  | 103 | — | — | 150 | Evaporated water |
|  | 104 | — | — | 28 | Precipitating NaCl |
|  | 105 | — | — | — | Precipitated NaCl layer |
|  | 106 | 1.34 | 100 | 4550 | Circ. bottom layer-OUT |
|  | 107 | 1.34 | 80 | 4550 | Circ. bottom layer-IN |
| 110 | 106 | 1.34 | 100 | 4550 | Circ. brine from pond 100-IN |
|  | 112 | 1.34 | 80 | 5235 | Circulating brine-OUT |
|  | 113 | — | — | 50 | Evaporated water |
|  | 114 | — | — | 8 | Precipitating NaCl |
|  | 115 | — | — | — | Precipitated NaCl layer |
|  | 142 | 1.29 | 36 | 745 | Make-up brine from pond 140-IN |
|  | 221 | — | — | — | NaCl to Ref. Plant 220 |
| 120 | 102 | 1.25 | 32 | 1050 | Upper layer brine-IN |
|  | 122 | 1.27 | 34 | 885 | Upper layer brine-OUT |
|  | 123 | — | — | 135 | Evaporated water |
|  | 124 | — | — | 28 | Precipitating NaCl |
|  | 125 | — | — | — | Prec. NaCl layer |
|  | 126 | 1.38 | 100 | 3500 | Circ. bottom layer-OUT |
|  | 127 | 1.38 | 80 | 3500 | Circ. bottom layer-IN |
| 130 | 126 | 1.38 | 100 | 3500 | Circ. brine from pond 120-IN |
|  | 131 | 1.34 | 80 | 685 | Make-up brine from pond 110-IN |
|  | 132 | 1.38 | 80 | 4060 | Circ. brine-OUT |
|  | 133 | — | — | 70 | Evaporated water |
|  | 134 | — | — | 45 | Prec. Carn. ($MgCl_2 . KCl . 6H_2O$) |
|  | 135 | — | — | — | Prec. Carn. layer |
|  | 136 | — | — | — | Carn. to Plants 190 & 200 |
| 140 | 122 | 1.27 | 34 | 885 | Upper layer brine-IN |
|  | 142 | 1.29 | 36 | 745 | Upper layer brine-OUT |
|  | 143 | — | — | 110 | Evaporated water |
|  | 144 | — | — | 27 | Prec. NaCl |
|  | 145 | — | — | — | Prec. NaCl layer |
|  | 146 | 1.42 | 100 | 5000 | Circ. bottom layer-OUT |
|  | 147 | 1.42 | 80 | 5000 | Circ. bottom layer-IN |
| 150 | 146 | 1.42 | 100 | 5000 | Circ. brine from pond 140-IN |
|  | 151 | 1.38 | 80 | 570 | Make-up brine from pond 130-IN |
|  | 152 | 1.42 | 80 | 5300 | Circ. brine-OUT |
|  | 153 | — | — | 100 | Evaporated water |
|  | 154 | — | — | 170 | Prec. bishofite($MgCl_2 . 6H_2O$) |
|  | 155 | — | — | — | Prec. bishofite layer |
|  | 156 | — | — | — | Bishofite to Plants 180 & 170 |
|  | 161 | — | — | — | Blow-down from stream 152 |

TABLE 1-continued
(FIG. 11)

| POND | STREAM NO. | DENSITY TONS/M³ | TEMPERATURE °C. | WEIGHT PER M³ DEAD SEA FEED BRINE - KGS | COMMENTS |
|------|------------|-----------------|-----------------|------------------------------------------|----------|
|      |            |                 |                 |                                          | to plant 160. |

What is claimed is:

1. A method of changing the salt content of a solution, comprising: establishing a non-convective solar pond including the salt, which pond is heated by solar radiation and has a stable salt-concentration gradient and a stable temperature gradient increasing from the top of the pond to the bottom thereof, the bottom layer of the pond being a substantially saturated solution at a predetermined temperature; introducing a feed solution containing the salt directly into the bottom layer and circulating same through the bottom layer; said predetermined temperature of the bottom layer being different from the initial temperature of the feed solution when introduced into the pond bottom layer and being selected to effect a change in solubility, and thereby a change in the salt content, of the feed solution by causing salt in the feed solution to be precipitated therefrom or additional salt to be dissolved in the feed solution; and withdrawing the resulting depleted or enriched feed solution.

2. The method according to claim 1, wherein the withdrawn solution is reconstituted to approximately the initial salt concentration and temperature, and the so reconstituted solution is reintroduced into and recirculated through the pond bottom layer.

3. The method according to claim 1, wherein the solar pond is a dissolution pond in which said predetermined temperature of the pond bottom layer is selected to increase the solubility of the feed solution, and thereby to promote the dissolution of additional salt at the pond bottom in the feed solution as it is circulated through the pond bottom layer, the thus enriched feed solution being subsequently withdrawn from the pond.

4. The method according to claim 1, wherein the solar pond is a precipitation pond in which the feed solution is a saturated solution and the predetermined temperature of the pond bottom layer is selected so as to decrease the solubility of the feed solution, and thereby to cause salt to be precipitated at the pond bottom, the thus depleted feed solution being subsequently withdrawn from the pond and the salt precipitated at the bottom of the pond being subsequently recovered.

5. The method according to claim 1, wherein said predetermined temperature of the pond bottom layer is higher than the initial temperature of the feed solution when introduced into the pond bottom layer so as to effect the change in solubility by controlled heating of the feed solution as it is circulated through the pond bottom layer.

6. The method according to claim 1, wherein said predetermined temperature of the pond bottom layer is lower than the initial temperature of the feed solution when introduced into the pond bottom layer so as to effect the change in solubility by controlled cooling of the feed solution as it is circulated through the pond bottom layer.

7. The method according to claim 1, wherein the feed solution is added to one end of the pond bottom layer, and the withdrawn solution is withdrawn from the opposite end of the pond bottom layer.

8. A method for effecting a controlled cooling of a feed solution containing a salt, comprising: establishing a non-convective solar pond including the salt, which pond is heated by solar radiation and has a stable salt-concentration gradient and a stable temperature gradient increasing from the top of the pond to the bottom thereof, the bottom layer of the pond being a substantially concentrated solution at a predetermined temperature; introducing the feed solution directly into the pond bottom layer; and circulating the feed solution through the pond bottom layer; said predetermined temperature of the pond bottom layer being lower than the initial temperature of the feed solution when introduced into the pond bottom layer to effect the desired controlled cooling of the feed solution as it is circulated through the pond bottom layer.

9. The method according to claim 6, wherein the feed solution is introduced at a predetermined level near the pond bottom, and heat is dissipated downwardly from said predetermined level at a rate such that the heat loss downwardly from said predetermined level exceeds the heat loss upwardly from said predetermined level, said heat being dissipated downwardly from said predetermined level by a colder solution flowing below said predetermined level.

10. The method according to claim 9, wherein said lower level solution is circulated in counter-current flow with respect to the feed solution introduced into the solar pond at said predetermined level.

11. The method according to claim 1, wherein stratification in the flowing bottom layer is prevented by confined mixing of the bottom layer.

12. The method according to claim 6, wherein the solar pond is a precipitation pond in which the feed solution is a saturated solution and the predetermined temperature of the pond bottom layer is selected so as to decrease the solubility of the feed solution, and thereby to cause salt to be precipitated at the pond bottom, depleted feed solution being subsequently withdrawn from the pond and the salt precipitated at the bottom of the pond being subsequently recovered.

13. The method according to claim 12, wherein said predetermined temperature of the pond bottom layer is such as to precipitate fully or partially dehydrated salt from the feed solution as it is circulated through the pond bottom layer.

14. The method according to claim 12, wherein the pond bottom layer depth and flow rate are controlled so as to effect a rate of temperature change in the feed solution as it is circulated through the pond bottom layer such as to promote the growth of the precipitated crystals.

15. The method according to claim 14, wherein the precipitated salt is KCl.

16. The method according to claim 4, wherein the feed solution introduced into the bottom layer of the precipitation pond is supplied from a dissolution non-convective solar pond having a predetermined bottom layer temperature such as to promote the dissolution of the salt therein.

17. A method according to claim 16, applied to the production of water soluble salts from deposits containing them, wherein said dissolution pond is constructed over the salt deposit; the predetermined temperature of the dissolution pond bottom layer being such as to promote the dissolution of salt therein, and the predetermined temperature of the precipitation pond bottom layer being such as to promote the precipitation of salts therefrom; the pond bottom layers of the two ponds being continuously circulated from one pond to the other, while additional solvent is added to the ponds to cover solvent losses and to maintain the required liquid level and concentration therein.

18. The method according to claim 16, wherein solvent is added to the dissolution pond in a plurality of stages, including a first stage in which sufficient solvent is added accompanied by mixing to form as concentrated a solution as possible, and a second stage in which additional solvent is added to form the desired concentration gradient.

19. The method according to claim 18, wherein the second stage is accomplished by introducing the additional solvent directly into the dissolution pond in the form of jets spouting upwardly from the bottom of the pond.

20. The method according to claim 19, applied to the production of a fully or partially dehydrated salt from a raw material containing the salt, wherein the raw material is dissolved in the dissolution pond having a bottom layer temperature such as to promote the dissolution of the salt therein; the bottom layer being then transferred to a precipitation pond having a temperature such as to promote the precipitation of the dehydrated salt; the depleted solution being then withdrawn from the precipitation pond and circulated through the bottom layer of the dissolution pond to dissolve additional salt.

21. The method according to claim 20, wherein dehydrated sodium sulphate ($Na_2SO_4$) is produced from a Mirabelite deposit or from Glauber salt ($Na_2SO_4 \times 10H_2O$); the bottom layer temperature of the dissolution pond being 25° C.-35° C., and that of the precipitation pond being 60° C.-100° C.

22. The method according to claim 20, wherein fully hydrated sodium-tetra-borate ($Na_2B_4O_7 \times 10H_2O$) is partially dehydrated to $Na_2B_4O_7 \times 5H_2O$; the bottom layer temperature of the dissolution pond being 80° C.-100° C., and that of the precipitation pond 65° C.-75° C.

23. The method according to claim 20, wherein fully hydrated Epson salt ($MgSO_4 \times 7H_2O$) is partially dehydrated to $MgSO_4 \times H_2O$; the bottom layer temperature of the dissolution pond being approximately 67° C., and that of the precipitation pond being 80° C.-100° C.

24. The method according to claim 20, wherein the production of the fully or partially dehydrated salt is carried out in two stages, including a first stage in which saturated solution from a first pond operated as a dissolution pond is circulated through a second pond operated as an ordinary evaporation or cooling pond wherein the hydrated salt is precipitated, and a second stage in which said second pond is converted into a non-convective solar pond having a bottom layer temperature considerably above the dehydration temperature of the hydrated salt thus melting same and causing part of it to precipitate as dehydrated salt and the rest to be dissolved in the water of crystalization to form a saturated solution of the salt, the latter being circulated through a third pond operated as an evaporation pond or crystalizer in which, said saturated solution is concentrated and cooled to a second temperature which is lower than the first temperature but higher than the dehydration temperature, said solution being then returned to the bottom layer of the second pond thereby causing additional dehydrated salt to be continuously precipitated in the third or second pond, depending on the solubility-temperature relationship.

25. The method according to claim 1 applied to the separation of a first salt from a second salt wherein the solubility of the first salt increases with temperature appreciably more than that of the second salt, the method being characterized in that a solution saturated in respect to both salts at ambient temperature is fed to the bottom of the non-convective solar pond wherein it is heated to a first temperature and is then fed to controlled temperature evaporation pond or crystalizer wherein it is concentrated at a second temperature, which is lower than the first temperature but higher than the initial ambient temperature, in order to precipitate the second salt only, the solution being then recycled through the bottom layer of said solar pond to be reheated and further concentrated until saturation of the first salt at the second temperature is reached, the solution being then transferred to another evaporation pond or crystalizer for the precipitation of the first salt.

26. The method according to claim 25 applied to upgrading Carnalite, wherein the initial saturated solution consists of brine concentrated by evaporation to a density of 1.3 gr/ $\mu m^3$, the said second salt being sodium chloride, the said first temperature being 60° C.-100° C., and the said second temperature being 40° C.-80° C., whereby the Carnalite precipitated is less contaminated with sodium chloride than that obtained by ambient evaporation.

27. The method according to claim 1 applied to the separation of a selected salt from a solution, wherein said feed solution is fed to the bottom layer of the non-convective solar pond to be heated to a predetermined temperature, and is then cycled to a controlled-temperature evaporation pond paired with said non-convection solar pond, the temperature and density of said evaporation pond being controlled so as to precipitate said selected salt therefrom.

28. The method according to claim 27, wherein said feed solution, before being fed to said bottom layer, is preconcentrated by feeding same through the upper layer of said non-convective solar pond in which solvent is evaporated, thereby utilizing the solar energy absorbed in the upper layer of the pond for pre-concentration in addition to utilizing the solar energy absorbed in the bottom layer for heating.

29. The method according to claim 27, applied to the separation of a plurality of salts from a solution, wherein there are a plurality of said non-convective solar ponds connected in series, each paired with a controlled-temperature evaporation pond, the temperature and density of each of the latter ponds being controlled to precipitate the selected salt therefrom.

* * * * *